(12) United States Patent
Gaul et al.

(10) Patent No.: US 8,900,006 B2
(45) Date of Patent: Dec. 2, 2014

(54) CHARGING CABLE PLUG FOR ELECTRIC VEHICLES

(75) Inventors: Armin Gaul, Selm (DE); Ingo Diefenbach, Unna (DE)

(73) Assignee: RWE AG, Essen (DE)

( * ) Notice: Subject to any disclaimer, the term of this patent is extended or adjusted under 35 U.S.C. 154(b) by 0 days.

(21) Appl. No.: 13/332,524

(22) Filed: Dec. 21, 2011

(65) Prior Publication Data

US 2012/0135634 A1     May 31, 2012

Related U.S. Application Data

(63) Continuation of application No. PCT/EP2010/056518, filed on May 12, 2010.

(30) Foreign Application Priority Data

Jun. 22, 2009 (DE) .......................... 10 2009 030 092

(51) Int. Cl.
*H01R 3/00* (2006.01)
*H01R 13/46* (2006.01)
*H01R 13/66* (2006.01)
*B60L 11/18* (2006.01)

(52) U.S. Cl.
CPC .............. *H01R 13/665* (2013.01); *Y02T 90/16* (2013.01); *Y02T 90/121* (2013.01); *B60L 2270/32* (2013.01); *Y02T 10/7005* (2013.01); *H01R 13/465* (2013.01); *B60L 2270/34* (2013.01); *Y02T 90/14* (2013.01); *B60L 11/1846* (2013.01); *Y02T 10/7088* (2013.01); *Y02T 90/128* (2013.01); *Y02T 90/163*
(2013.01); *Y02T 90/169* (2013.01); *Y04S 30/14* (2013.01); *B60L 11/1818* (2013.01)
USPC ......................................................... 439/489

(58) Field of Classification Search
USPC .................. 439/488, 489, 352, 346, 315, 848
See application file for complete search history.

(56) References Cited

U.S. PATENT DOCUMENTS

| 2,004,242 | A |   | 6/1935  | Heitger |
|-----------|---|---|---------|---------|
| 2,005,184 | A |   | 6/1935  | Forrest |
| 3,270,267 | A | * | 8/1966  | Nolte, Jr. ...................... 320/138 |
| 4,915,639 | A | * | 4/1990  | Cohn et al. .................... 439/188 |
| 5,151,048 | A | * | 9/1992  | Sato ............................... 439/357 |
| 5,174,787 | A | * | 12/1992 | Shirai et al. ................... 439/489 |
| 5,297,015 | A | * | 3/1994  | Miyazaki et al. ............. 363/146 |
| 5,357,076 | A | * | 10/1994 | Blankenship ............ 219/121.54 |
| 5,369,352 | A | * | 11/1994 | Toepfer et al. ................ 320/110 |
| 5,484,298 | A | * | 1/1996  | Flum et al. .................... 439/188 |
| 5,641,299 | A | * | 6/1997  | Meguro et al. ................ 439/347 |

(Continued)

FOREIGN PATENT DOCUMENTS

| CN | 1385937 A   | 12/2002 |
| CN | 101356705 A | 1/2009  |

(Continued)

*Primary Examiner* — Neil Abrams
*Assistant Examiner* — Travis Chambers
(74) *Attorney, Agent, or Firm* — Reinhart Boerner Van Deuren P.C.

(57) ABSTRACT

Charging cable plug 1 for electric vehicles, with a housing 2 and electrical contacts 6, arranged in the housing 2, for connection to a charging station 4. For simple identification before a charging procedure, an identification means 8 is proposed, arranged in the housing 2 and communicating with the charging station 4 via the electrical contacts 6.

10 Claims, 2 Drawing Sheets

(56) References Cited

U.S. PATENT DOCUMENTS

| | | | |
|---|---|---|---|
| 5,758,414 A | 6/1998 | Ehrenfels | |
| 5,864,580 A * | 1/1999 | Lowe et al. | 375/222 |
| 6,056,590 A * | 5/2000 | Takahashi et al. | 439/489 |
| 6,831,443 B2 * | 12/2004 | Liu | 320/113 |
| 7,167,078 B2 * | 1/2007 | Pourchot | 340/5.61 |
| 7,275,970 B2 * | 10/2007 | Hoshina | 439/894 |
| 7,314,392 B2 * | 1/2008 | Pharn et al. | 439/676 |
| 7,695,310 B1 * | 4/2010 | Boyer et al. | 439/489 |
| 7,950,943 B2 * | 5/2011 | Ohtomo | 439/299 |
| 8,004,267 B2 * | 8/2011 | Chen et al. | 323/346 |
| 8,449,318 B2 * | 5/2013 | Beller et al. | 439/489 |
| 8,564,403 B2 * | 10/2013 | Landau-Holdsworth et al. | 340/5.8 |
| 8,583,834 B2 * | 11/2013 | Schwenk et al. | 710/1 |
| 2004/0242087 A1 | 12/2004 | Hoshina | |
| 2005/0184856 A1 | 8/2005 | Pourchot | |
| 2007/0126395 A1 | 6/2007 | Suchar | |
| 2009/0263999 A1 * | 10/2009 | Onoue | 439/215 |
| 2011/0300753 A1 * | 12/2011 | Ichikawa et al. | 439/620.21 |
| 2012/0045926 A1 * | 2/2012 | Lee | 439/488 |
| 2012/0106672 A1 * | 5/2012 | Shelton et al. | 375/295 |

FOREIGN PATENT DOCUMENTS

| | | |
|---|---|---|
| CN | 101364653 A | 2/2009 |
| CN | 201210314 Y | 3/2009 |
| DE | 297 02 766 U1 | 5/1997 |
| DE | 19613793 A1 | 10/1997 |
| DE | 69420449 T2 | 12/1999 |
| DE | 102005046040 A1 | 4/2007 |
| DE | 10 2007 002 025 A1 | 7/2008 |
| DE | 10 2007 017 407 A1 | 10/2008 |
| EP | 2 017 582 A1 | 1/2009 |
| JP | 2009050154 A | 3/2009 |

* cited by examiner

CHARGING CABLE PLUG FOR ELECTRIC VEHICLES

CROSS-REFERENCE TO RELATED PATENT APPLICATIONS

This patent application is a continuation of International application No. PCT/EP2010/056518 filed on May 12, 2010, which claims the benefit of German application No. 10 2009 030 092.9 filed on Jun. 22, 2009, the teachings and disclosure of which are hereby incorporated in their entirety by reference thereto.

FIELD OF THE INVENTION

The subject-matter relates to a charging cable plug for electric vehicles with a housing and electrical contacts, arranged in the housing, for connection to a charging station. In addition to this, the subject matter relates to a charging cable with such a plug, as well as to a system with such a plug.

BACKGROUND OF THE INVENTION

The distribution of electrically powered vehicles will increase considerably in the near future. With the distribution of electric vehicles, however, new demands are being imposed on the supply infrastructure. Electric vehicles must be able to be supplied with electrical energy not only in the domestic environment but also outside the domestic environment. To achieve this, it is intended that charging stations should be made available in public locations, at which users of electric vehicles can obtain electrical energy. The charging stations may be arranged, for example, in public car parks, in multi-storey car parks, or in private parking places, for example in the area of the user's workplace. Users of electric vehicles could then connect their vehicles to such charging stations. During their absence the battery of the electric vehicles can be charged.

The electrical energy obtained by the users of electric vehicles must, however, be paid for. Accordingly, it must be determined which user obtains what amount of electrical energy, in order to be able to bill this user. In particular in the case of publicly accessible charging stations, it must be ensured that a user only pays for the electrical energy which he actually obtains. In addition, it must be ensured that electrical energy is only made available to such users that have a valid supply contract with an energy provider. Accordingly, an identification of the user must be provided to the charging station, and thus to the energy provider, prior to a charging procedure. Only by means of successful identification can the supply of energy be cleared.

A problem with the use of stationary charging stations that are accessible in public areas, however, is that the structure of the electric vehicles will be heterogeneous, which means that the widest range of electric vehicles with the widest range of plugs and plug systems will be operated. There has still been no standard developed by means of which electric vehicles can be identified to a charging station. In addition to this, for example with retrofitted electric vehicles, the integration of identification hardware into the vehicle itself can be difficult.

For the reasons given above, the subject-matter was based on the object of providing a simple and versatile identification of users to charging stations.

SUMMARY OF THE INVENTION

This objective is achieved with respect to the subject-matter by a charging cable plug for electric vehicles with a housing and electrical contacts, arranged in the housing, for connection to a charging station, in such a way that an identification means is arranged in the housing which communicates with the charging station via the electrical contacts.

It has been recognised that the identification of the user does not necessarily have to take place via the vehicle. It has also been recognised that user interfaces at the charging station, by means of which an identification could be made, are complicated to operate, and are rejected by users. Users want to be able to charge their vehicle with electrical energy without having to carry out a manual operation. Users do not wish to be bothered by the matter of identification. With solutions according to the prior art, however, either a customer card must be carried or an identification number entered for this purpose. These solutions discourage users, however, from using the charging stations informally.

With respect to the subject-matter, informal use of the charging stations is possible in that the charging cable plug itself has identification means with which the user and the charging cable respectively can be identified to a charging station. Thanks to the integration of the identification means in the plug of the charging cable, which is inserted into the charging station, identification takes place in a manner entirely disassociated from the user and from the vehicle or from identification means carried by the user. In this way, the widest range of vehicles from the widest range of manufacturers can be charged at one and the same charging station without agreement having to be reached with regard to an identification standard. All that is necessary is for the user to use the charging cable plug with the identification means, by means of which he can identify himself to the charging station.

It should be noted that the use of the term "charging cable plug" is meant to indicate a part of the charging cable and of the housing in the vicinity of the socket outlet. Accordingly, a second housing, arranged in direct proximity to the charging cable plug and connected by the cable to the plug itself, also falls under the term "charging cable plug". In particular, all solutions which arrange the identification means in direct proximity to the receiver for the plug of the charging station fall under the term "charging cable plug".

It should further be noted that the electrical contacts may be communication contacts as well as energy contacts. For example, the electrical contacts may be part of a pilot lead. The electrical contacts may also be part of a power or energy lead.

The charging cable can be inserted into the vehicle on the vehicle side. The vehicle itself does not need to carry out any identification procedure in respect of the charging station. This means that, in addition to electric cars, electrically operated rollers or other electrically driven vehicles can also obtain electrical energy from the charging station by using the charging cable plug according to the subject-matter. An "intelligent" charging control system inside the vehicle, with which identification of the vehicle or the user takes place, can be omitted. The whole of the "intelligence" required for identification to the charging station and therefore to the network operator and/or energy provider, is, according to the subject-matter, located in the charging cable plug itself.

According to an embodiment, it is proposed that the identification means be formed such as to transfer an identification signal via the contacts to the charging station. The identification means can be an electrical circuit, by means of which signals can be coupled into the electrical connection between plug and charging station. The signals can thereby be modulated either analogue or digitally. The identification signal can be a signal which contains the identification of the charging cable plug. This identification can, for example, be an unambiguous identifier.

It is also possible for the identification signal to be transferred by means of a suitable encoding procedure, such that the identification of the charging cable plug is only recognisable to the charging station itself. Reading out the identification signal from other locations outside the charging station can be avoided by encoding the identification signal. For example, the identification signal can be encoded by means of a public key of the charging station (advantageously, there is one single key for all the charging stations in the network, since otherwise all public keys for all charging stations would have to be known in the identification means), which can be permanently deposited in the charging cable plug. This signal can then be decoded in the charging stations by means of a private key stored therein.

The identification signal and the identification data respectively can identify the user, an energy supply contract, contract parameters and/or the like. It is possible for the identification signal or the identification data to be loaded into the charging cable plug by means of programming of the plug. In this respect, the identification signal or the identification data can be stored in a memory arranged in the charging cable plug. The memory can be a non-volatile memory. The memory can store the identification data in an encoded manner.

It is also possible for the identification data only to be present in encoded form in the charging cable plug, and loaded already in encoded form into the charging cable plug. At the transfer from the charging cable plug to the charging station, the identification signal transfers the encoded data, and there is no need for this data to be encoded in the charging cable plug itself. The decoding of the identification data, which is loaded into the charging station with the identification signal, can take place in the charging station. Accordingly, the public key for the loading station(s) would only have to be known at the programming of the charging cable plug. No logic system is then required in the charging cable plug itself in order to carry out the encoding. This reduces the costs of a charging cable plug. This is of advantage in particular if the identification data is semi-static. This data hardly changes, with the result that encoding in advance is possible.

According to an embodiment, it is also proposed that the housing has a receiver for a locking means of the charging column such that after the locking means has been received, the plug is secured by positive fit (form fit, form closure) to the charging column. For example, it is possible that after the locking means have been engaged in the charging cable plug, the charging cable plug is secured in the charging station such that it cannot be detached. The locking means for the charging station can be moved on receipt of the identification signal such that it can be moved into the receiver of the charging cable plug. This then prevents the charging cable plug from being pulled out of the charging station. This can prevent the possibility that after an activation of the supply of energy, the charging cable could be pulled unobserved out of the charging station, and the energy made available could be obtained by an unauthorised person.

Means may be provided which detect a forced separation of the charging cable from the charging station. Such detection means may be present in the charging station as well as in the charging cable plug. If these means detect a forced separation, the supply of energy can be stopped. This also prevents an unauthorised obtaining of the energy provided.

In order to enable the authorised user to withdraw the charging cable from the charging station, however, when he wishes to terminate the charging procedure, this must be signalled through the plug to the charging station. The vehicle itself cannot carry out such signalling, since it is the charging cable plug which communicates with the charging station and not the vehicle, at least, according to the subject-matter, not with regard to the release of the electrical energy. For this reason the housing has a reading means configured to read a user identification, wherein the reading means is in operational connection with the identification means. With the aid of the reading means, a user identification can be read out from a data carrier, such as a key. This user identification identifies the user in respect of the charging cable plug. Once successful identification as been established, this can be notified to the identification means.

According to an embodiment, it is proposed that the reading means be formed for contact-free reading of a key emitting a user identification. The key can, for example, be a transponder. The transponder can, for example, be activated and interrogated by means of a high-frequency reading field, which is emitted by the reading means. The transponder is activated by the reading field and consequently emits its identifier. This identifier can likewise be emitted in the high-frequency range. The energy for emitting the identifier is provided on the part of the transponder by means of a battery and/or the reading field. The key can, for example, be a transponder in a car key or a transponder on a key ring.

In order to read a transponder, it is proposed, according to an embodiment, that the reading means be a transponder reading device. The transponder reading device can emit the reading field in a high frequency range. The reading field can be disseminated, for example, around the charging cable plug. If a transponder enters the reading field, the transponder can obtain energy from the reading field, and with this energy the transponder can emit its own identifier by means of a transmission field. This identifier can be received and evaluated by means of the transponder reading device.

According to an embodiment, it is proposed that the reading means be formed to issue a signal to the identification means on receipt of the user identification. In this situation, the reading means can, for example, transmit the user identification to the identification means. A check on the user identification can be carried out in the identification means, and, if the check is positive, clearance for the charging cable plug can be issued by the charging station.

According to an exemplary embodiment, it is proposed that, with a positive check on the user identification, the identification means transmit a release signal to the charging station, at least deactivating the locking means. If it is determined in the charging cable plug that the authorised user has approached the charging cable plug, or his key is in the reading field, the identification means can transmit a release signal from the charging cable plug to the charging station. By means of this release signal, it can be signalled to the charging station that the locking means is deactivated. Deactivation of the locking means can be, for example, removal of the locking device from the receptacle in the plug. For example, a bolt of the locking means can be moved out of the receptacle in the plug.

According to an embodiment, it is proposed that the release signal interrupts the supply of energy through the charging station. In this situation, interruption means may be present in the charging station, for example, which, on receipt of the release signal, interrupts the supply of energy to the charging cable plug. It is thereby ensured that, after an authorised removal of the charging cable plug from the charging station, no further energy can be obtained from the charging station. Only when an authorised charging cable plug is plugged into the charging station again can the supply of energy be activated again by means of the corresponding device in the charging station.

According to an embodiment, it is also proposed that in the housing a connection identification means be arranged, which identifies an electrical connection of the contacts to a charging station, wherein the connection identification means activates the identification means when a recognised connection to the charging station is identified. The identification means are intended only to send the identification via the contacts when the charging cable plug is connected to the charging station. To do this, it is necessary for the identification means to emit the identification signal only when the plug is plugged into the charging station. By means of the connection identification means, the fact that the plug is plugged into the charging station is established. The identification means can hereupon emit the identification signal. This means that once the plug has been inserted into the charging station, the identification signal is transferred by the identification means to the charging station via the electrical contacts.

A further subject-matter is a charging cable with a charging cable plug as described above. The charging cable can be provided on the vehicle side with a socket which is connected to the vehicle. On the charging station side, the charging cable plug according to the subject-matter is used to identify the charging cable to the charging station. Every user can therefore carry his own charging cable with him and identify himself to the charging station by means of the charging cable or the charging cable plug.

According to a further subject-matter, a system is proposed with such a charging cable and a charging station.

The system can advantageously be equipped with a key emitting a user identification for communication with the reading means in the charging cable plug. The key may, for example, be the transponder referred to above.

According to an embodiment, the charging station may have a locking means for locking the plug in the charging station after the receipt of an identification signal from the plug. The locking means may, for example, be one or more bolts, which on receipt of the identification signal, are pushed into a receiver in the plug, such that the plug can no longer be removed from the charging station. Only after receipt of the release signal can the locking means be deactivated and the plug released.

According to an embodiment it is also proposed that the charging station has an energy release means for releasing a supply of energy to the plug on receipt of an identification signal from the plug and/or for interrupting the supply of energy on receipt of the release signal from the plug.

BRIEF DESCRIPTION OF THE DRAWINGS

The subject-matter is explained in greater detail hereinafter on the basis of a drawing showing exemplary embodiments. In the drawing.

DETAILED DESCRIPTION OF THE INVENTION

Figure 1:
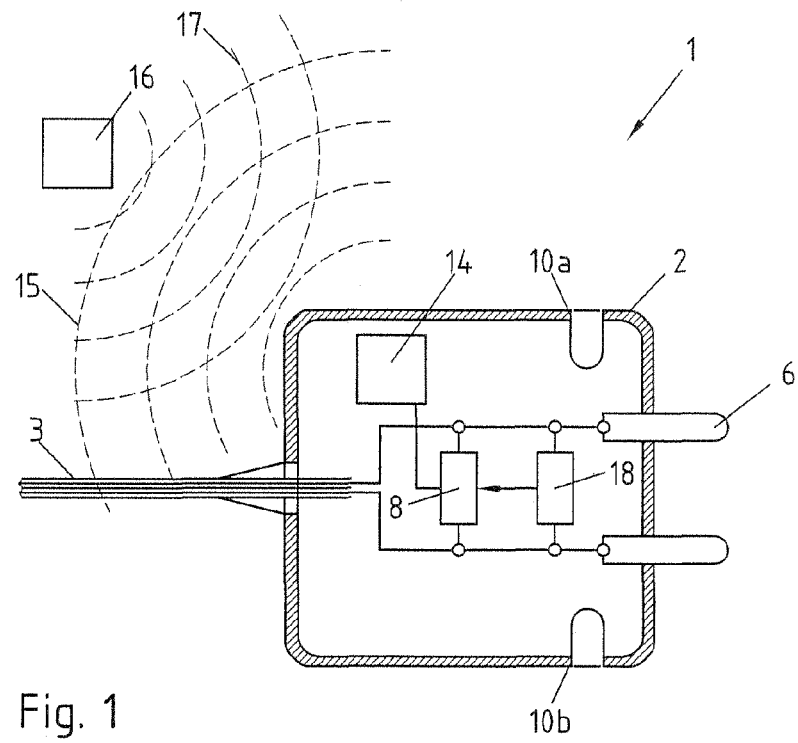
FIG. 1 shows a charging cable plug according to an advantageous exemplary embodiment.

FIG. 1 shows a charging cable plug 1 with a housing 2. Leading into the housing 2 is a charging cable 3, which is connected to a socket on the side not shown, which can be connected to a vehicle. The housing 2 has electrical contacts 6. The electrical contacts 6 are electrically connected to the conductors of the charging cable 3. An electrical circuit is arranged in the housing 2 as identification means 8. This can be a microprocessor, on which the corresponding logic is stored. In addition, a reading means 14 is arranged in the housing 2. The reading means 14 is in operational connection with the identification means 8. The reading means 14 is a transponder reading device, which emits a reading field, such as a high-frequency 22 kHz signal 15, and can receive a transmitting field 17 of a transponder 16, for example likewise in the kHz range. Also provided in the housing 2 is a connection identification means 18, which can likewise be a microprocessor, on which the corresponding logic is stored. The connection identification means 18 is in operational connection with the identification means 8. Finally, a receptacle 10 is provided in the housing 2, formed, for example, from two grooves 10a, 10b. The receptacles 10 are intended to accommodate a locking means 12 of the charging station, which is described hereinafter.

The identification means 8 is electrically connected to the leads of the cable 3. By means of this electrical connection, the identification means 8 can modulate an identification signal onto the leads of the charging cable 3 and therefore onto the electrical contacts 6. Thereby it is possible for an identification of the charging cable plug 1 to be issued via the electrical contacts 6 to the charging station 4. The identification signal can contain identification data of the user or of the charging cable. This identification data is modulated onto the conductor by means of the identification means 8.

The connection identification means 18 is connected to the contacts 6 in such a way that it detects the connection of the contacts 6 to contacts 20 in the charging station 4. If the contacting of the contacts 6 to the contacts 20 is detected by the connection identification means 18, then the connection identification means 18 activates the identification means 8 by way of an appropriate signal. Thereupon, the identification means 8 sends the identification data via the contacts 6 to the charging station 4.

Figure 2:
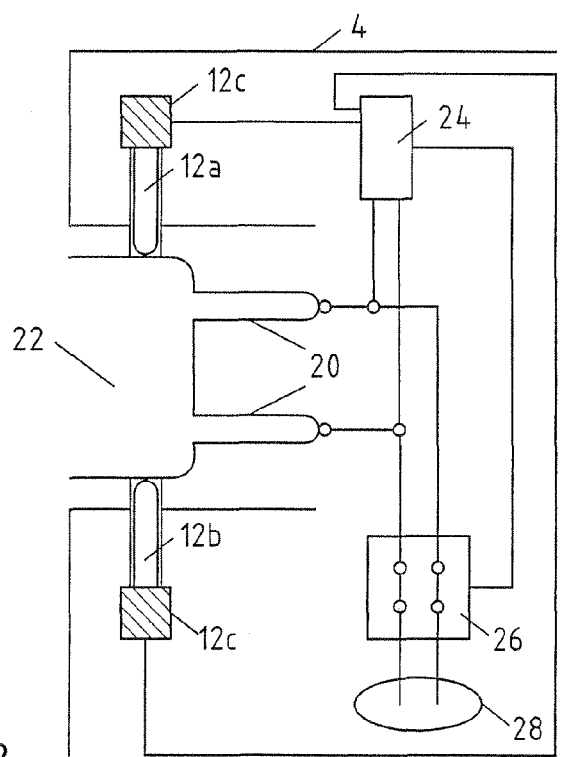
FIG. 2 shows a schematic detailed view of a charging station.

FIG. 2 shows a schematic detailed view of a socket 22 of a charging station 4. It can be seen that contacts 20 are provided in the socket 22, which are shaped so as to receive the contacts 6. It can further be seen that a locking means 12 is provided in the charging station 4. The locking means 12 can be formed from two bolts 12a, 12b, and a drive 12c. By means of the drive 12c, the bolts 12b can be pushed out of the position shown into an extended position, as will be shown hereinafter.

In addition, the charging station 4 has a control unit 24. The control unit 24 is electrically connected to the contacts 20. The control unit 24 receives, for example, the identification data by means of the information signal from the identification means 8 via the contacts 20. As well as this, the control unit 24 receives a release signal from the identification means 8. Communication is possible between the plug 1 and the charging station 4 by means of the control unit 24.

Finally, the charging station 4 has an energy release means 26, which is connected to the control unit 24. The energy release means 24 can be moved by the control unit 24 into a closed position, as shown. In the closed position, a supply of energy to the contacts 6 is possible via the contacts 20. The control unit 24 can, in addition, actuate the energy release means 26 in such a way that an electrical connection between the lead 28 and the contacts 20 is interrupted.

Figure 3:
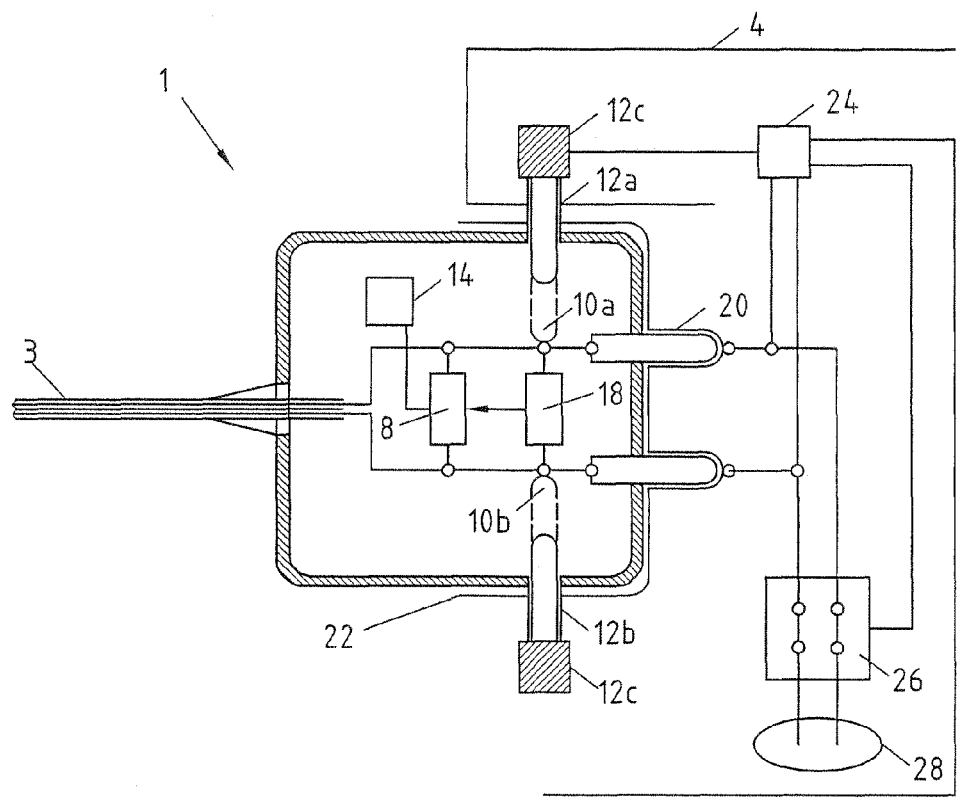
FIG. 3 shows a schematic detailed view of a charging station with a plug.

FIG. 3 shows the plug 1 in a pushed-in state in the charging station 4. If the plug 1 is plugged into the socket 22 of the charging station 4, the contacts 6 then come into electrical contact with the contacts 20. This contacting is sensed by way of the connection identification means 18. This can be effected, for example, by the control unit 24 emitting electrical pulses regularly via the contacts 20. If these electrical pulses are conducted from the contacts 20 via the contacts 6 onto the conductors of the cable 3, then they can be detected by the connection identification means 18. If a connection is detected, the connection identification means 18 activates the identification means 8.

The identification means 8 thereupon modulates identification data as an identification signal onto the conductors of the cable 3. This identification signal is transferred via the contacts 6 and the contacts 20 onto the electrical conductors inside the charging station 4. The control unit 24 can receive and evaluate the identification signal. In this connection it is possible, for example, for the identification signal to be an encoded signal, which contains the identification data in an encoded manner. The encoding can take place, for example, by means of an asymmetrical encoding process. This can be done with a public key of the charging station 4, which can be the same, for example, for all stations 4 located in the network. With a private key of the charging station 4, which can be deposited in the control unit 24, the identification signal and therefore the identification data can be decoded.

An identification of a user is carried out in the control unit. In this situation it is possible, for example, that the control unit communicates via the lead 28 or via a network connection (not shown) with a central computer and checks the authorisation of the user on the basis of the identification data. If the check in the control unit 24 is positive, then the control unit 24 issues a locking signal to the locking means 12. Thereupon the drive 12c of the locking means 12 is activated and the bolts 12a and 12b are moved out of a first position into a second position shown in FIG. 3. In the second position, the bolts 12a, 12b engage in the receptacles 10a, 10b of the plug 1. The locking means 12 thereupon sends a positive locking signal to the control unit 24, whereupon the control unit 24 identifies that the plug 1 is locked in the socket 22.

The control unit 24 can then activate the energy release means 26, in such a way that the lead 28 is brought into electrical contact with the contacts 20. As a result, a supply of energy to the charging cable 3 via the plug 1 is possible. An electric vehicle connected to the charging cable 3 can obtain energy from the charging column 4.

If a user now wishes to remove the plug 4 from the socket 22 in order to terminate the charging procedure, the user must authenticate himself with regard to the plug 1. To do this, a reading field 15 can be permanently emitted by means of the reading means 14. The reading field 15 allows a transponder 16 to obtain energy. If the transponder 16 is activated by a reading field 15, the transponder 16 sends a sending field 17 containing an identification of the transponder 16. This sending field 17 can be received by the reading means 14. An evaluation of the sending field 17 and the identification data contained therein makes it possible for the reading means to check whether the transponder 16 is an entitled transponder 16.

If a check is positive, the reading means 14 issues a signal to the identification means 8. Thereupon, the identification means 8 can issue a release signal via the contacts 6 and the contacts 20 to the control unit 24. On receiving the release signal, the control unit 24 first causes the contacts of the energy release means 26 to open, such that a supply of energy is interrupted. The control unit 24 then causes the locking means 12 to be activated, such that the drive 12c of the locking means 12 moves the bolts 12a, 12b back into the position shown in FIG. 2. Thereupon, the plug 1 can be removed from the socket 22 of the charging station 4.

If a non-authorised transponder 16 approaches the plug 1, this transponder also emits a sending field 17 with an identification. This identification can likewise be evaluated in the reading means 14. However, a non-authorised transponder does not lead to the reading means 14 activating the identification means 8 to issue the release signal.

Figure 4:
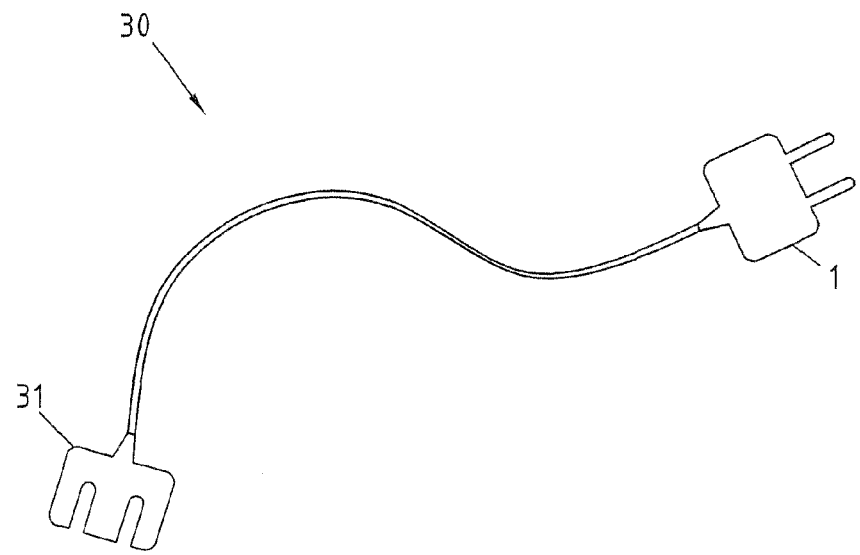
FIG. 4 shows a charging cable according to an advantageous exemplary embodiment.

FIG. 4 shows a charging cable 30 with a plug 1 and a socket 31. The plug 1, as shown in FIG. 3, can be inserted into a charging station 4. The socket 31 can be connected to a vehicle. The vehicle can be electrically connected to a charging station 4 via the charging cable 30, and can also obtain electrical energy via said charging cable 30.

By means of the plug 1 according to the subject-matter, it is possible to guarantee an identification independently of a logic unit inside a vehicle. This means that power can be obtained in a particularly simple manner. A user interaction with a charging station 4 can be dispensed with. The charging cable 30 according to the subject-matter can be used with a large number of different vehicles, without the vehicles having to be retrofitted for the connection to the charging station 4.

The invention claimed is:

1. Charging cable plug for electric vehicles, comprising:
   a housing;
   electrical contacts, arranged in the housing, for connection to a charging station;
   an identification circuit arranged in the housing and communicating with the charging station via the electrical contacts;
   wherein the housing has a reading circuit configured to read a user identification, and in that the reading circuit is in operational connection with the identification circuit; and
   wherein the reading circuit is formed for contact-free reading of a key emitting a user identification.

2. Charging cable plug for electric vehicles, comprising:
   a housing;
   electrical contacts, arranged in the housing, for connection to a charging station;
   an identification circuit arranged in the housing and communicating with the charging station via the electrical contacts;
   wherein the housing has a reading circuit configured to read a user identification, and in that the reading circuit is in operational connection with the identification circuit; and
   wherein the reading circuit is a transponder reading device.

3. Charging cable with a charging cable plug of claim 2.

4. System with a charging cable of claim 3 and a charging station.

5. System of claim 4, wherein a key emitting a user identification is provided for communication with the reading circuit.

6. Charging cable plug for electric vehicles, comprising:
   a housing;
   electrical contacts, arranged in the housing, for connection to a charging station;
   an identification circuit arranged in the housing and communicating with the charging station via the electrical contacts;
   wherein the housing has a reading circuit configured to read a user identification, and in that the reading circuit is in operational connection with the identification circuit; and wherein the reading circuit is formed to emit a signal to the identification circuit on receipt of the user identification.

7. Charging cable plug for electric vehicles, comprising:
a housing;
electrical contacts, arranged in the housing, for connection to a charging station;
an identification circuit arranged in the housing and communicating with the charging station via the electrical contacts;
wherein the housing has a reading circuit configured to read a user identification, and in that the reading circuit is in operational connection with the identification circuit; and
wherein the identification circuit, on receipt of the signal from the reading circuit, transmits a release signal to the charging station, at least deactivating a locking unit.

8. Charging cable plug of claim 7, wherein the release signal interrupts the supply of energy through the charging station.

9. System comprising a charging cable and a charging station, the charging cable having a charging cable plug, the charging cable plug comprising:
a housing;
electrical contacts, arranged in the housing, for connection to a charging station;
an identification circuit arranged in the housing and communicating with the charging station via the electrical contacts;
wherein the housing has a reading circuit configured to read a user identification from a data carrier at the reading circuit, and in that the reading circuit is in operational connection with the identification circuit; and
wherein the charging station has locking unit for locking the plug in the charging station after the receipt of an identification signal from the plug.

10. System of claim 9, wherein the charging station has energy release circuit for at least one of 1) releasing a supply of energy to the plug on receipt of an identification signal from the plug and/or 2) for interrupting the supply of energy on receipt of a release signal from the plug.

* * * * *